Jan. 5, 1937.  H. D. ELSE  2,066,931
BEARING
Filed Feb. 23, 1934  2 Sheets—Sheet 1
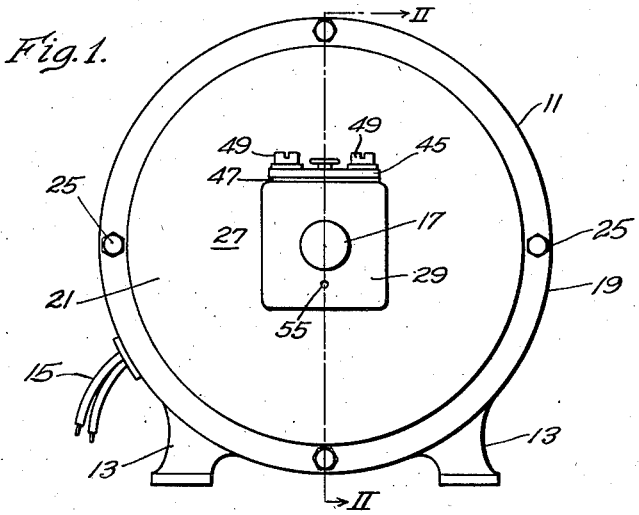
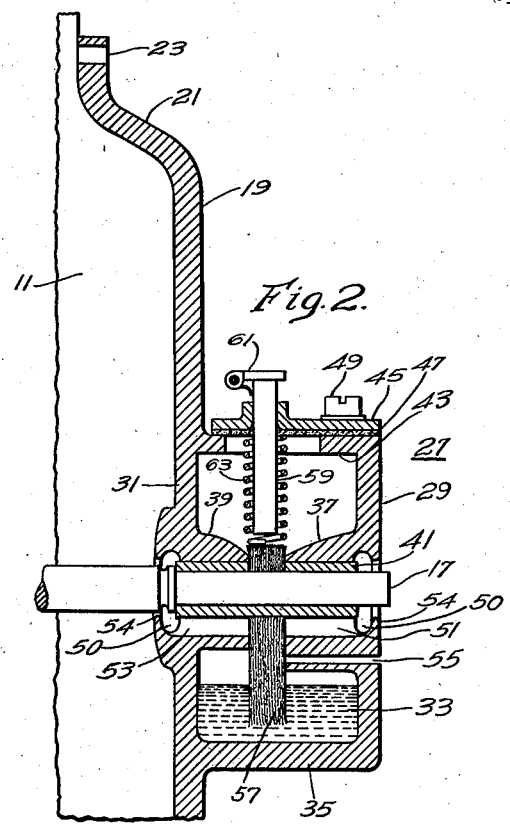
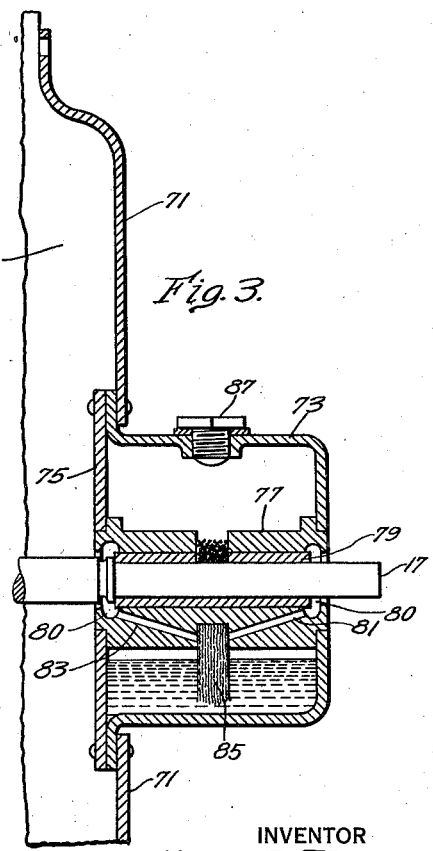
WITNESSES:
INVENTOR
Harry D. Else.
BY
ATTORNEY Jan. 5, 1937.  H. D. ELSE  2,066,931
BEARING
Filed Feb. 23, 1934   2 Sheets-Sheet 2

INVENTOR
Harry D. Else.

Patented Jan. 5, 1937

2,066,931

UNITED STATES PATENT OFFICE 2,066,931

BEARING

Harry D. Else, Springfield, Mass., assignor to Westinghouse Electric & Manufacturing Company, East Pittsburgh, Pa., a corporation of Pennsylvania Application February 23, 1934, Serial No. 712,494

1 Claim. (Cl. 308—36.1)

My invention relates to motors and more particularly to motor bearings.

An object of my invention is to provide a relatively simple and efficient bearing structure for a rotatable shaft, that shall have a relatively large oil capacity and embody a circulatory oiling system.

Another object of my invention is to provide a bearing structure for a rotatable shaft that shall be capable of retaining a relatively large amount of oil in the bearing structure irrespective of the position into which the bearing may be moved.

Other objects will either be apparent from this specification or will be pointed out hereinafter.

In practicing my invention I provide a chambered bearing housing having openings therethrough in opposing walls for receiving a shaft, and having a bearing sleeve supported therein, together with reentrant annular flanges secured to the walls of the housing to support the sleeve effectively, and angularly inclined drain-back holes in the reentrant flanges.

In the drawings,

Figure 1 is a view in end elevation of an electric motor with which is associated the device embodying my invention;

Fig. 2 is a partial sectional view therethrough, on an enlarged scale, taken on the line II—II of Fig. 1;

Fig. 3 is a similar sectional view through a bearing housing and the bearing bracket showing a modification embodying my invention;

Figure 4:
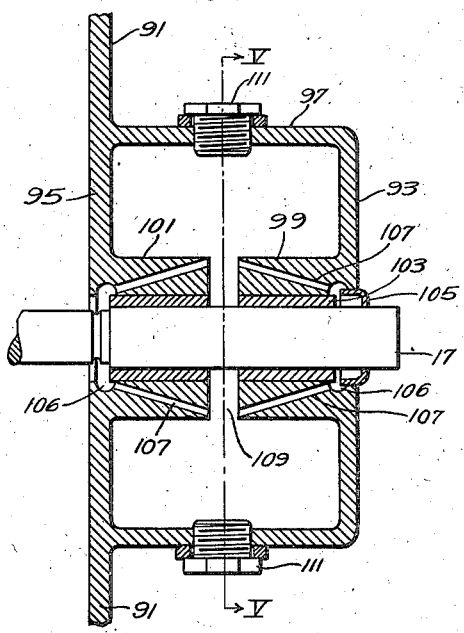
Fig. 4 is a view similar to Figs. 2 and 3 showing a still further modification.

As is well known, the ordinary bearing for a rotating shaft, particularly of the wick lubricated kind used in small or fractional horse power motors, is so designed as to have a relatively small oil-containing or oil-holding capacity. It has been found that only the oil held in suspension in the wick itself remains in the bearing of a motor after it has been shipped to its destination. This makes it necessary to refill the oil chamber before starting it up and also quite frequently during operation if, for any reason, during the assembly of a motor or during the mounting of a motor in operative relation with some mechanism or appliance to be driven thereby, it is tilted, in which case it may happen that much of the oil in the oil chambers of the bearings is lost. My invention overcomes this by so shaping the various cooperating parts of a bearing housing as to insure that there will be a relatively large oil-holding chamber available irrespective of the normal or the abnormal position into which the motor may be moved either temporarily or permanently.

I have illustrated an electric motor 11 in end view in Fig. 1 of the drawings, and it is to be understood that it includes a stator having legs 13, a stator structure therein including energizing windings, which are indicated generally by the leads 15, as well as a motor structure indicated by a rotor shaft 17, and two bearing brackets 19, only one of which is shown in Fig. 1 of the drawings.

The bearing bracket 19 may be a casting and may be generally of the shape shown in Fig. 2 of the drawings, that is, it may include an outer annular plate portion 21 having a plurality of peripherally spaced openings 23 therethrough to receive securing bolts 25 (shown in Fig. 1 of the drawings), as well as a bearing housing indicated at 27. This bearing housing is hollow and may be of any desired contour although I have shown it as of substantially rectangular contour in Fig. 1 of the drawings. The housing 27 includes an outer wall 29 and an inner wall 31 which are spaced apart a suitable distance to provide an oil chamber 33 therebetween, there being a peripheral portion 35 unitary with the two walls.

Reentrant flange portions 37 and 39 are cast integral with the side walls 29 and 31, respectively, and extend toward each other and toward the central or median lateral plane of the housing. A bearing sleeve 41 is supported by the reentrant unitary flanges 37 and 39, it being understood that suitable machine work is done in a manner well known in the art to support and properly locate the sleeve 41 in the hollow flanges 37 and 39. One end of the motor shaft 17 is supported in the usual manner in sleeve 41. The normally upper portion 43 of the peripheral part 35 of the housing may have an opening therein, which opening may be covered by a clamping plate 45 and a gasket 47 therebetween, a plurality of clamping screws 49 being used. An oil catching annular groove 50 is provided in wall 29 and a similar groove is provided in wall 31, in a manner well known in the art.

If the motor is to be used in substantially only one position, that is, with the legs 13 resting on a substantially horizontal floor, I provide a pair of cored relatively deep drain-back or oil-return holes 51 and 53 in the annular flanges 37 and 39, respectively. These drain-back holes start within the side walls 29 and 31 and extend toward the mid-portion of the bearing housing, and break out at the inner surface of the respective annular flanges 37 and 39. It is obvious that the bottom of the oil return holes 51 and 53 must be lower than the bottom edge 54 of the outer wall of the oil-catching annular groove. I may provide also an oil overflow hole 55 in the outer annular flange 37 and the outer wall 29. It will thus be possible to fill the chamber 33 with oil up to the level of the bottom of the oil overflow opening 55. Wicking 57 is located between the opposed adjacent faces of flanges 37 and 39 to move the oil from the bottom of the chamber 33 to a window in the top part of sleeve 41 in a manner well known in the art.

In order to permit filling the oil chamber 33 in the housing I provide a relatively long tube 59 which extends through the top wall 43, has an oil tight connection with plate 45 and is closed by a snap lid or cap 61 so as to provide an oil-tight joint. A spring 63 may be located around tube 59 to hold the upper end of the wicking in the window of sleeve 41.

Referring now to Fig. 3 of the drawings, I have there shown a somewhat different form of bearing bracket and bearing housing, the bearing bracket including more particularly a flange portion 71 which may be made of stamped or punched sheet metal. The bearing housing may be constructed of a dished portion 73 of stamped sheet metal and a closure plate 75 of substantially the shape shown in Fig. 3 of the drawings, which are riveted or welded together and against the inner periphery of annular member 71 to provide a rigid and non-leaking structure. A bearing sleeve support 77, which may be of tubular shape, is located between the end walls of members 73 and member 75 before their assembly and the periphery at the ends of member 77 are united with members 73 and 75 in an oil-tight manner. A bearing sleeve 79 is located within member 77 to receive the rotor shaft 17. Annular oil catching grooves 80 are provided adjacent each end of sleeve 79.

Drilled oil-return holes 81 and 83 extend angularly downwardly and inwardly in substantially the same way as is set forth in connection with the device shown in Fig. 2. Wicking 85 is provided to conduct the oil from the bottom of the bearing housing, constituted by members 73 and 75, to a window in sleeves 77 and 79. An oil plug 87 is provided which provides an oil-tight closure for the housing.

Figure 5:
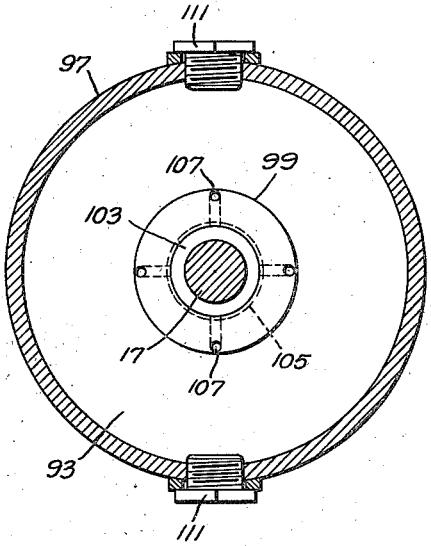
Fig. 5 is a view in section through the device shown in Fig. 4 and taken on the line V—V thereof.

Referring now to Figs. 4 and 5 of the drawings, I have there illustrated a further modification of a device embodying my invention which is particularly applicable to a motor which may be mounted either on the floor, on the ceiling or on either of two side walls. The outer peripheral portion 91 of the bearing bracket may be of substantially the same shape as shown in Fig. 2 of the drawings, and an outer wall 93 and an inner wall 95 of a bearing housing may be integral with member 91. A peripheral wall 97 may also be integral therewith as by casting the same together. Reentrant flange portions 99 and 101 are also made integral with walls 93 and 95 respectively adjacent to the central opening in each of the walls, and extend toward each other to within a short distance and a bearing sleeve 103 may be located within the tubular reentrant flanges and receive the rotor shaft 17. An oil retaining collar 105 may be provided if deemed necessary and extend into one of two oil catching grooves 106. A plurality of drain-back holes 107 are provided, each one of which extends angularly through one of the flanges 99 or 101, being closer to the shaft 17 or the sleeve 103 at the outer ends of the bearing housing and being further away from the sleeve or shaft near the mid-portion of the housing. It will be noted that the oil-return holes break out in the space 109 between the adjacent inner faces of flanges 99 and 101. I provide a plurality of screw plugs 111 which may be located diametrally opposite of each other if two are used or which may be located 90° apart if four such plugs are used.

Figure 6:
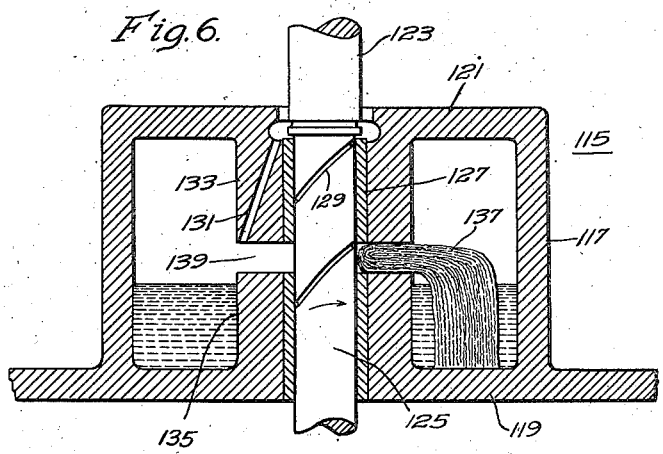
Fig. 6 is a fragmentary view in vertical section showing my invention as applied to the vertical shaft bearing.

Referring to Fig. 6 of the drawings, I have there illustrated my invention as applied to a vertical shaft. A bearing housing 115 is constituted by an outer annular wall 117, a base portion 119 and a top annular portion 121, which portions may be integral with each other as by casting the same. It is to be understood that any other mechanical parts may be associated with housing 115 and the extension of base portion 119 thereof but these are not shown as they have no direct relation to my invention.

A vertical shaft 123 has its lower portion 125 extending into and through the housing 115 and is guided therein by a sleeve 127. While I have not shown the bearing sleeve 127 as supporting any of the weight of shaft 123 and of any parts which may be associated therewith or mounted thereon, this may, of course, be done if desired. The bearing portion 125 of shaft 123 is provided with a helical groove 129 therearound which extends in such direction that oil will be forced upwardly along the shaft and inside of sleeve 127 by the rotation of shaft 123. An oil-return hole 131 is provided in the upper annular reentrant flange 133 but the lower annular reentrant flange 135 is not provided with an oil return hole as this is unnecessary. Wicking 137 may extend from the bottom of the oil chamber in the housing to a window 139 and against the shaft and while I have shown one such wicking only it is, of course, possible to use several.

It may be here pointed out that a bearing housing constructed as shown in the drawings will have a relatively large capacity for receiving and retaining oil, which oil can extend up to or close to the bottom of overflow hole 55 as shown in Fig. 2 of the drawings without loss. It is further obvious that it is possible to turn the bearing brackets shown in the different figures of the drawings into any one of the four positions which they would occupy if the motor were located either on the floor or the ceiling of a room, or on either of the two side walls, without appreciable change of capacity for retaining the oil. It is further obvious that the motor or the bearing bracket itself could be stood on end, that is, that the normally horizontal shaft 17 in Figs. 1, 2, 3, 4 and 5 may be changed to have a substantially vertical position without appreciable variation in the oil-holding capacity of the bearing housing. It is, of course evident that this is because of the fact that the annular reentrant flanges are relatively long, that is, that they extend to within a short distance of each other in the mid-portion of the bearing housing.

It is further evident that as the oil is fed to the shaft at the window or the space between the reentrant flanges and at the top of the shaft it will move along the shaft to both ends of the flanges and will be caught in the annular oil-catching grooves provided and that this oil will be returned to the oil chamber through the drain-back holes shown in the various figures of the drawings thus providing a circulatory oiling system.

The same comments hold with regard to Fig. 6 of the drawings if the normally vertical shaft is tilted or turned into other than the vertical position, as may happen during handling of motors at the time when they are mounted in their final operative position associated with some mechanism to be driven thereby.

The device embodying my invention thus provides a relatively simple means for obtaining a relatively large oil retaining capacity in a bearing thereby making it unnecessary to refill the bearing at frequent intervals.

Various modifications may be made in the device embodying my invention without departing from the spirit and scope thereof, and I desire, therefore, that only such limitations shall be placed thereon as are imposed by the prior art or are set forth in the appended claim.

I claim as my invention:

A bearing structure for a rotatable shaft, including a chambered housing having walls spaced apart axially of a shaft and having an opening in each wall, said openings being axially aligned with each other, annular flanges secured to the spaced walls at the openings therein and extending axially toward and to within a short distance from the central lateral plane of the bearing housing, and an oil drain-back hole in each flange breaking out through the inner end face of the flange, one of said flanges also having an overflow hole extending from an inner end face through said flange and the adjacent wall.

HARRY D. ELSE.